(12) United States Patent
Gelfuso et al.

(10) Patent No.: US 12,194,883 B2
(45) Date of Patent: Jan. 14, 2025

(54) VEHICLE ELECTRIC POWER TAKE-OFF

(71) Applicant: Ford Global Technologies, LLC, Dearborn, MI (US)

(72) Inventors: Dominic Gelfuso, Plymouth, MI (US); Andres Straulino, Royal Oak, MI (US); Prahlad Saggere, Wixom, MI (US); Christopher Ballard, Redford, MI (US); Stuart C. Salter, White Lake, MI (US); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 18/163,148

(22) Filed: Feb. 1, 2023

(65) Prior Publication Data
US 2024/0253518 A1 Aug. 1, 2024

(51) Int. Cl.
*B60L 55/00* (2019.01)
*H02M 3/335* (2006.01)

(52) U.S. Cl.
CPC ............ *B60L 55/00* (2019.02); *H02M 3/335* (2013.01); *B60L 2210/10* (2013.01)

(58) Field of Classification Search
CPC ....................................................... B60L 55/00
See application file for complete search history.

(56) References Cited

U.S. PATENT DOCUMENTS

| | | | |
|---|---|---|---|
| 10,877,537 B1 | 12/2020 | Varughese et al. | |
| 2009/0112384 A1* | 4/2009 | Jeon ................... | H01M 8/04302 701/22 |
| 2010/0207635 A1* | 8/2010 | Plagens ................ | B60L 3/0023 324/509 |
| 2013/0106365 A1* | 5/2013 | Ang ........................ | B60L 1/003 320/138 |
| 2016/0154446 A1 | 6/2016 | Mullins et al. | |
| 2017/0158062 A1* | 6/2017 | Emrani .................... | B60L 58/15 |
| 2018/0079314 A1* | 3/2018 | Kashyap ................. | B60L 53/20 |
| 2020/0337168 A1 | 10/2020 | Kuttenkuler et al. | |
| 2021/0170911 A1* | 6/2021 | Ichikawa ................ | B60L 58/31 |
| 2021/0237608 A1* | 8/2021 | Ghannam ................ | B60L 53/16 |
| 2022/0105807 A1 | 4/2022 | Schumacher et al. | |
| 2022/0289057 A1* | 9/2022 | Tsuchiya ................. | B60L 53/24 |

FOREIGN PATENT DOCUMENTS

| | | |
|---|---|---|
| CN | 112498112 A | 3/2021 |
| JP | 2006341779 A | 12/2006 |
| WO | 2022061241 A1 | 3/2022 |

* cited by examiner

*Primary Examiner* — Jared Fureman
*Assistant Examiner* — Esayas G Yeshaw
(74) *Attorney, Agent, or Firm* — David Kelley; McCoy Russell LLP

(57) ABSTRACT

Methods and systems for supplying electrical power from a vehicle to an external accessory are described. In one example, two different voltages may be applied at different times to a connector so that the external accessory device need not include a battery. In particular, a first voltage may power a main load of the external accessory and a second voltage may power a microcontroller that communicates with the vehicle.

20 Claims, 4 Drawing Sheets

VEHICLE ELECTRIC POWER TAKE-OFF

FIELD

The present description relates generally to methods and systems for an electric power take-off that may supply electrical power to accessories that are external to a vehicle. The methods and systems may be particularly useful for vehicles that provide electrical power at worksites.

BACKGROUND/SUMMARY

An electric or hybrid vehicle may provide electric power to accessories that are not part of the electric or hybrid vehicle. For example, an electric vehicle may supply electric power to trailers, tools, and lighting at worksites. The electric power may be delivered from an electric energy storage device on a vehicle to an electric power consumer that is external to the vehicle via a dedicated electric power take-off. The electric power take-off may transfer electric power from the vehicle to an accessory via an electric power cord that extends from the vehicle. The electric power cord may include a connector that engages with the external accessory. Alternatively, the external accessory may include a power cord that engages a connector of the vehicle.

Before power is transferred from the vehicle to the accessory, it may be desirable to perform a system check to verify that the accessory is an accessory that is approved to receive power from the vehicle. However, to perform the system check, it may be desirable have power at the accessory. One way to have power at the accessory is to include a battery with the accessory. But, the accessory may go through long periods of lack of use before the accessory is used. During these long periods, battery charge may not be possible to maintain due to the accessory's location and where electric power is available to charge the battery. Therefore, it may be desirable to provide an accessory that does not include a battery. However, if electric power to perform the system check is provided via the vehicle, a custom power connector may be needed. Custom power connectors may be expensive and they may be more difficult to find in supplier inventory. Therefore, it may be desirable to provide a system that allows power to be transferred from a vehicle to an external accessory that does not use a battery and a custom electrical connector.

The inventors herein have recognized the above-mentioned issues and have developed an electric power take-off system for a vehicle, comprising: a connector including at least one pin configured to transfer communication data and a first pin and a second pin configured to transfer electric power; a DC/DC converter electrically coupled to a traction battery and a first relay group, the first relay group electrically coupled to the first pin and the second pin; and a power source electrically coupled to a second relay group, the second relay group electrically coupled to the first pin and the second pin.

By selectively electrically coupling a DC/DC converter and a power source to two pins of a connector via two relays, it may be possible to provide the technical result of reducing a total number of pins of an electrical connector. Further, the electrical connector may transfer a low voltage that charges a capacitor to power a controller in an accessory device so that the accessory device may communicate with a controller in a vehicle without a battery in the accessory device.

The present description may provide several advantages. Specifically, the approach may allow an existing electric power connector having a limited number of pins to be used to exchange electric power between a vehicle and an external accessory. Further, the approach allows an accessory device to communicate with a vehicle controller without a battery in the accessory device.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
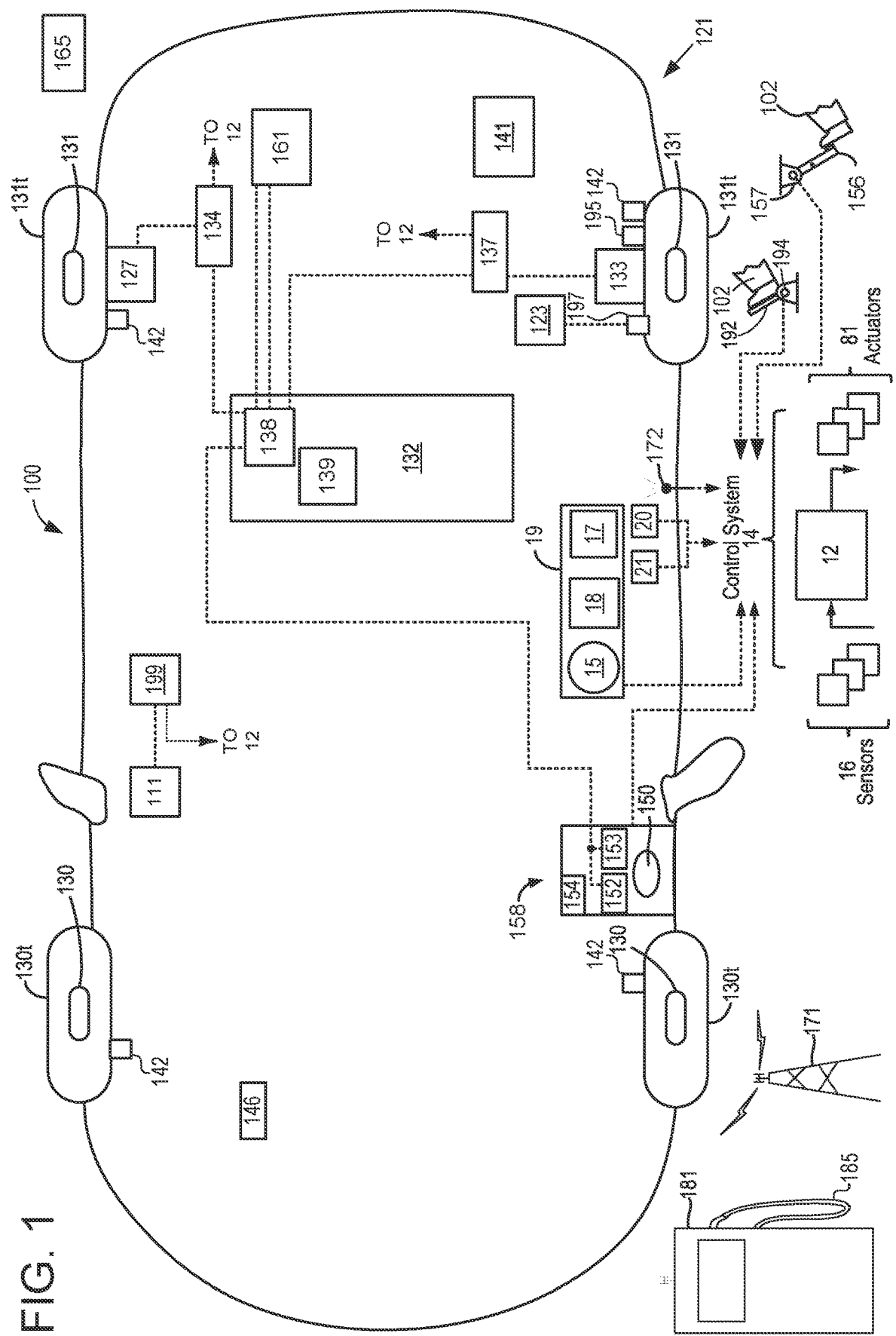
FIG. 1 is a schematic diagram of an example vehicle driveline and electric power system.
Figure 2:
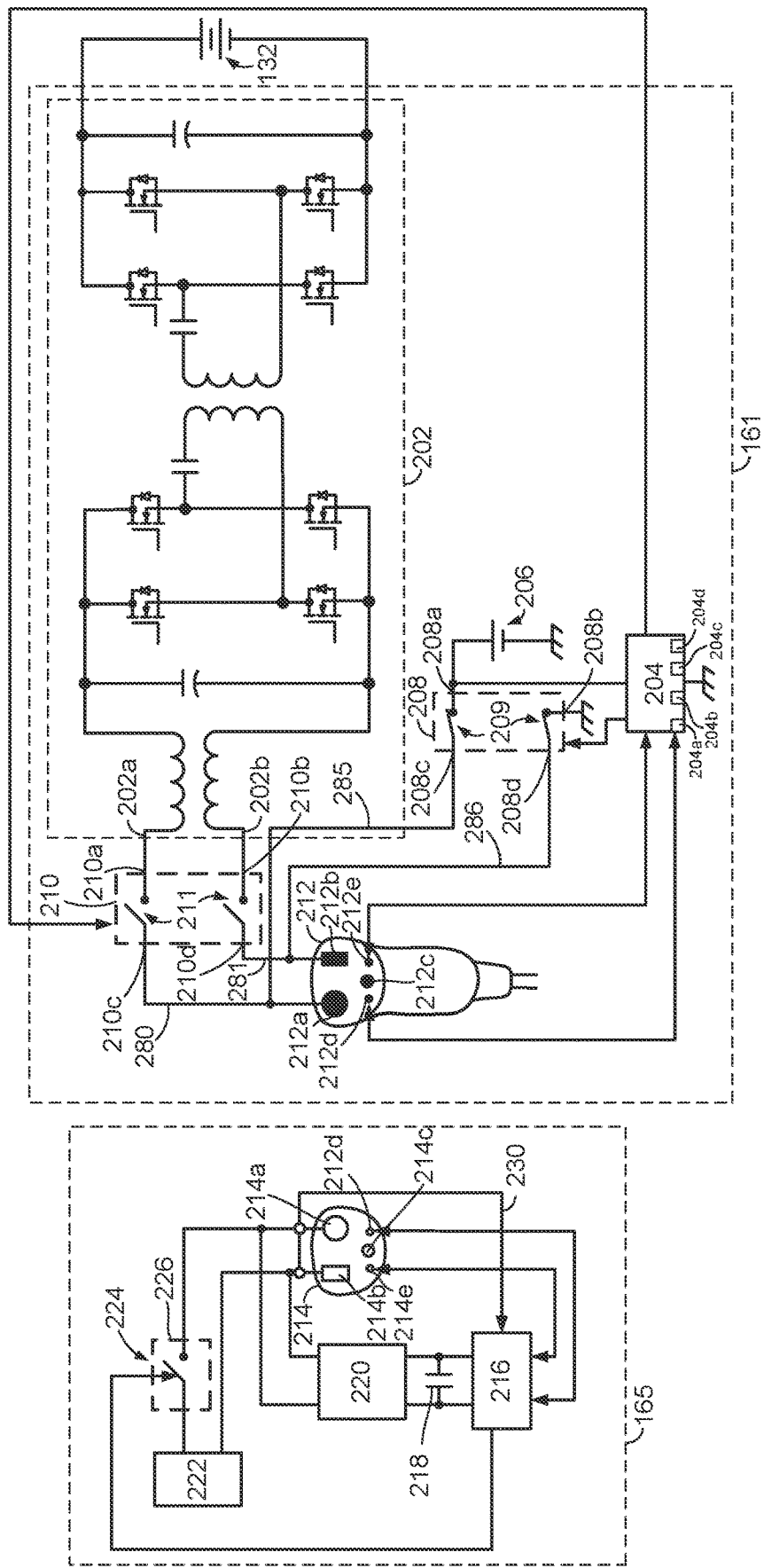
FIG. 2 shows an example electric power take-off system for transferring power from a vehicle to an accessory that is external to the vehicle.
Figure 3:
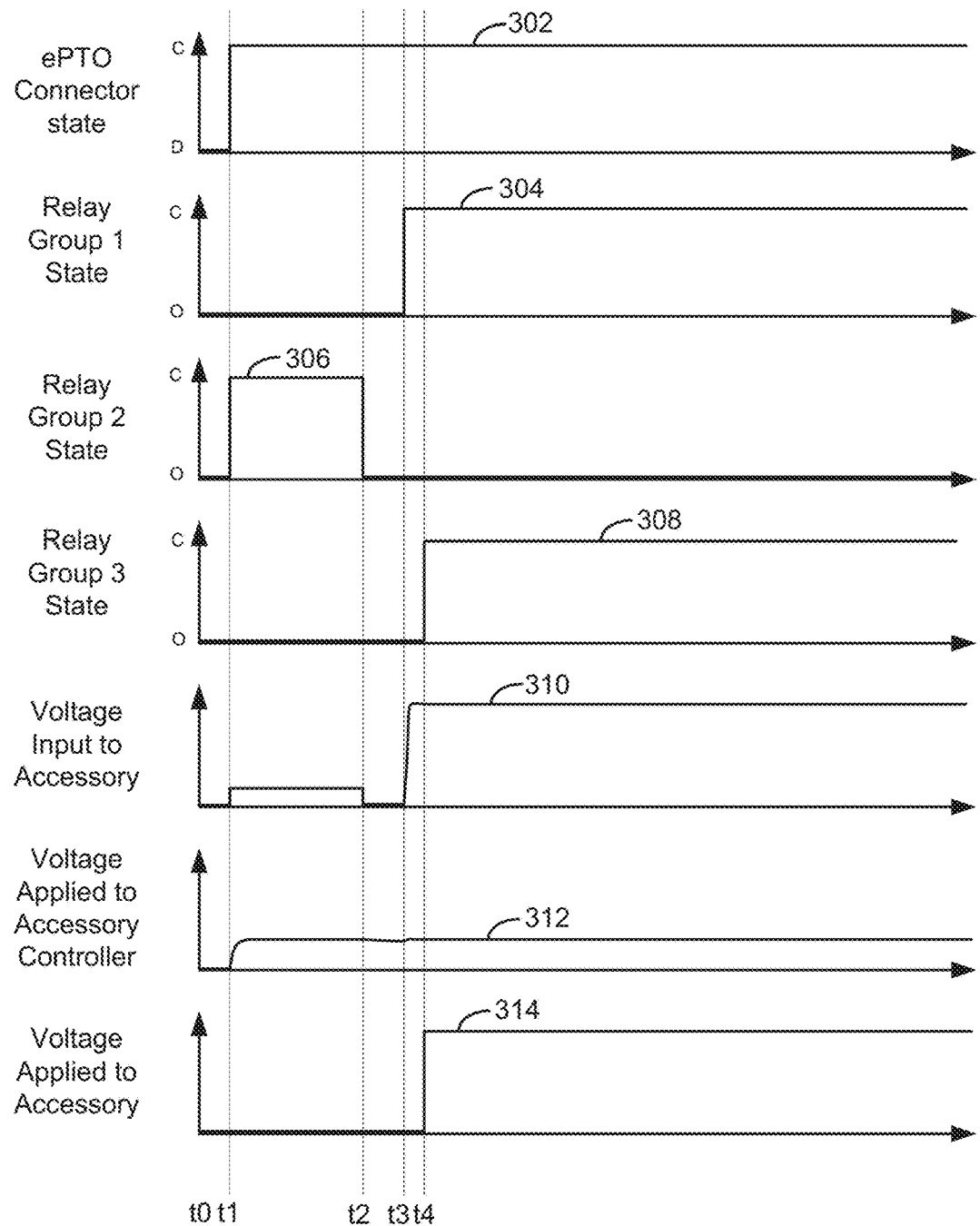
FIG. 3 shows a sequence for providing power from a vehicle to an accessory that is external to the vehicle.
Figure 4:
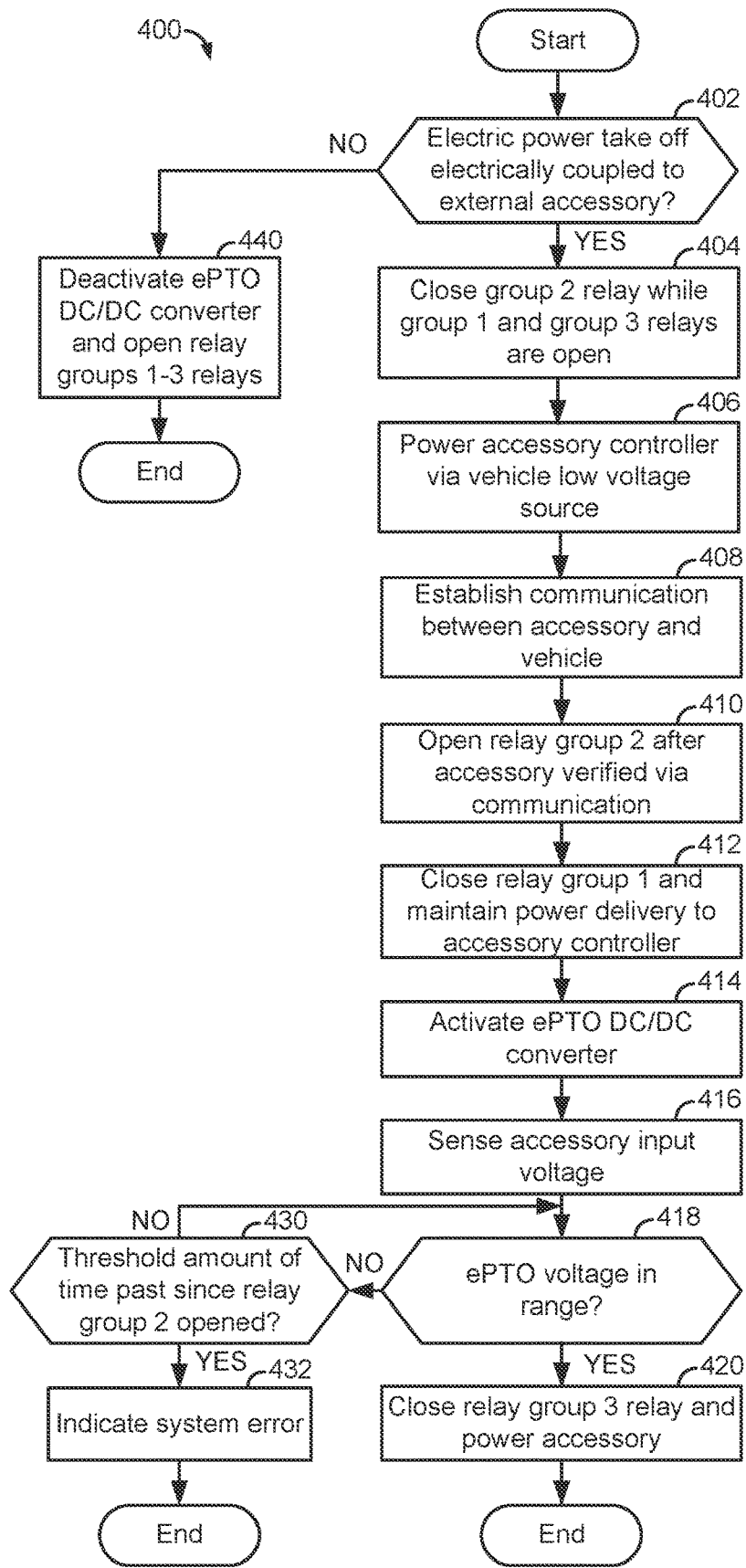
FIG. 4 shows example method for transferring electrical power from a vehicle to an accessory that is external to the vehicle.

The following description relates to systems and methods for transferring electric power from a vehicle to an accessory device that is external from the vehicle. FIG. 1 shows a non-limiting example vehicle configuration for an electric vehicle that includes a traction battery (e.g., a battery that supplies electric charge to an electric machine that provides propulsive effort for a vehicle) that may selectively supply power to an accessory device. A power system for supplying electric power to an accessory device is shown in FIG. 2. Initiation of an electric power transfer cycle is shown in FIG. 3. Finally, a method for transferring power from a vehicle to an accessory device is shown in FIG. 4.

FIG. 1 illustrates an example vehicle propulsion system 100 for vehicle 121. In this example, vehicle propulsion system 100 includes two electric machines that may be applied to propel vehicle 121. Specifically, vehicle propulsion system 100 includes a first electric machine 127 that is coupled to solely one wheel. Vehicle propulsion system 100 also includes a second electric machine 133 that is coupled solely to one wheel. In this example, the rear wheels are driven, but in other examples the front wheels may also be driven.

A first inverter system controller 134 may convert alternating current generated by electric machine 127 to direct current for storage at the electric energy storage device 132 and vice versa. A second inverter system controller 137 may convert alternating current generated by second electric machine 133 to direct current for storage at the electric energy storage device 132 and vice versa.

Electric machine 127 and electric machine 133 are controlled via controller 12. The controller 12 receives signals from the various sensors shown in FIG. 1. In other examples, two or more controllers may perform the functions and operations of controller 12. In addition, controller 12 employs the actuators shown in FIG. 1 to adjust driveline operation based on the received signals and instructions stored in memory of controller 12.

Vehicle propulsion system 100 includes front wheels 130 and rear wheels 131. In this example, one rear wheel is coupled to electric machine 127 and the other rear wheel is coupled to electric machine 133. Electric machines 127 and 133 may receive electrical power from onboard electric energy storage device 132. Furthermore, electric machines 127 and 133 may provide a generator function to convert the vehicle's kinetic energy into electrical energy, where the electrical energy may be stored at electric energy storage device 132 for later use by the electric machine 127 and/or 133. A first inverter system controller (ISC1) 134 may convert alternating current generated by electric machine 127 to direct current for storage at the electric energy storage device 132 and vice versa. A second inverter system controller (ISC2) 137 may convert alternating current generated by electric machine 133 to direct current for storage at the electric energy storage device 132 and vice versa. Electric energy storage device 132 may be referred to as a traction battery since it may supply electric charge to electric machines (e.g., 127 and 133) that provide propulsive effort to vehicle 121. Electric energy storage device 132 (e.g., a traction battery) may output a relatively higher voltage (e.g., >400 volts DC).

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc. Further, electric energy storage device 132 may supply electric power to an external accessory device 165 via electric power take-off system 161.

Control system 14 may communicate with one or more of electric machine 127, electric energy storage device 132, electric machine 133, etc. Control system 14 may receive sensory feedback information from one or more of electric machine 133, electric machine 127, electric energy storage device 132, etc. Further, control system 14 may send control signals to one or more of electric machine 133, electric machine 127, electric energy storage device 132, etc., responsive to this sensory feedback. Control system 14 may receive an indication of an operator requested output of the vehicle propulsion system from a human operator 102, or an autonomous controller. For example, control system 14 may receive sensory feedback from driver demand pedal position sensor 194 which communicates with driver demand pedal 192. Similarly, control system 14 may receive an indication of an operator requested vehicle braking via a human operator 102, or an autonomous controller. For example, control system 14 may receive sensory feedback from brake pedal position sensor 157 which communicates with brake pedal 156.

Electric energy storage device 132 may periodically receive electrical energy from a charging station 181. Charging station 181 may be comprised of a single charger that includes a controller, multiple chargers and charger controllers, multiple chargers including controllers and servers where the servers are configured to exchange data with one or more chargers and one or more networks 171 (e.g., internet, cellular network, satellites, etc.). Charging station 181 may supply electric charge to vehicle traction battery charging port 150 via cable 185.

Charging station 181 may supply alternating current (AC) or direct current (DC) power may be received via a traction battery charging port 150. The traction battery charging port 150 may include separate terminals or connections for AC and DC power. In the present example, traction battery charging port 150 may be part of a vehicle charging module 158. Vehicle charging module 158 may include an AC/DC converter 152, a DC/DC converter 153, and power management and communication circuitry 154. AC/DC converter 152 converts AC power at a first voltage to DC power at a second voltage that is appropriate for charging electric energy storage device 132. DC/DC converter 153 converts DC power at a first DC voltage to DC power at a second DC voltage that is appropriate for charging electric energy storage device 132. Power management and communications circuitry 154 may allow controller 12 to communicate with charging station 181 and electric power take-off 161. Further, controller 12 may communicate with charging station 181 from a distance via transceiver 172. Transceiver 172 allows vehicle 121 to send and receive data from charging station 181. Charging station 181 may be electrically coupled to an electric power grid (not shown) and charging station may include a transceiver (not shown).

While the vehicle propulsion system is operated to propel the vehicle, charging cable 185 may be disconnected from vehicle 121. Control system 14 may identify and/or control the amount of electrical charge stored at the electric energy storage device 132, which may be referred to as the state of charge (SOC).

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle propulsion system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. The control system may adjust electric machine output and/or the torque vectoring electric machines to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensors 199 may also be communicated to controller 12, or alternatively, sensors 199 may be electrically coupled to controller 12.

One or more tire pressure monitoring sensors (TPMS) may be coupled to one or more tires (e.g., 130*t* and 131*t*) of wheels (e.g., 130 and 131) in the vehicle. For example, FIG. 1 shows a tire pressure sensor 197 coupled to wheel 131 and configured to monitor a pressure in a tire 131*t* of wheel 131. While not explicitly illustrated, it may be understood that each of the four tires indicated in FIG. 1 may include one or more tire pressure sensor(s) 197. Furthermore, in some examples, vehicle propulsion system 100 may include a pneumatic control unit 123. Pneumatic control unit 123 may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1.

For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Additionally, vehicle propulsion system 100 may further include an inclinometer 21.

Vehicle propulsion system 100 may further include a brake system control module (BSCM) 141 to apply and release friction wheel brakes 142. In some examples, BSCM 141 may comprise an anti-lock braking system, such that tires (e.g., 130t and 131t) of wheels (e.g. 130, 131) may maintain tractive contact with the road surface according to driver inputs while braking, which may thus prevent the wheels from locking up, to prevent skidding.

Vehicle propulsion system 100 may further include a motor electronics coolant pump (MECP) 146. MECP 146 may be used to circulate coolant to diffuse heat generated by at least electric machine 127 and electric machine 133 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, inertial sensors 199, etc. In some examples, sensors associated with electric machine 133 and electric machine 127, etc., may communicate information to controller 12, regarding various states of electric machine operation.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 133 and electric machine 127) based on an operator input. Various examples of the operator interface 15 may include interfaces that apply a physical apparatus, such as an active key, that may be inserted into the operator interface 15 to activate electric machines 133 and 127, or may be removed to shut down the electric machines 133 and 127 to turn off the vehicle. Other examples may include a passive key that is communicatively coupled to the operator interface 15. The passive key may be configured as an electronic key fob or a smart key that does not have to be inserted or removed from the operator interface 15 to operate the electric machines 133 and 127. Rather, the passive key may need to be located inside or proximate to the vehicle (e.g., within a threshold distance of the vehicle).

While FIG. 1 shows an electric vehicle, the methods and systems of the present description are not limited to electric vehicles. Rather, the present system and method may be applied to hybrid vehicles and vehicles that are propelled solely via an internal combustion engine.

Referring now to FIGS. 2, a detailed schematic of an example electric power take-off system 161 is shown. In addition, a detailed schematic of an example external accessory device 165 is shown. The electric power take-off system 161 and external accessory device 165 are exemplary in nature and are not to be interpreted as limiting.

Electric power take-off system 161 includes a DC/DC converter 202 that may adjust a voltage output of electric energy storage device 132 to a higher or lower voltage depending on the traction battery voltage and the voltage used to operate the external accessory device 165. Output 202a of the DC/DC converter 202 (e.g., positive output) is input to a first group relay 210 at input terminal 210a. Likewise, a negative output 202b of the DC/DC converter 202 is input to the first group relay 210 at input terminal 210b. Positive voltage output from DC/DC converter 202 may be selectively output to output terminal 210c of the first group of relays 210. Negative voltage output from DC/DC converter 202 may be selectively output to output terminal 210d of the first group of relays 210. In this example, first group relay 210 includes double pole single throw (alternatively two single pole single throw) contacts 211 that may be selectively simultaneously opened or closed via controller 204.

Output terminal 210c is directly electrically coupled to pin 212a of connector 212 via conductor 280. Output terminal 210d is directly electrically coupled to pin 212b of connector 212 via conductor 281. Herein directly electrically coupled to refers to electrically coupling one electrical device (e.g., relay, controller, capacitor, battery, pin, DC/DC converter, etc.) to another electrical device without an intervening electrical device between the two electrical devices that are directly electrically coupled. Electrical devices that are electrically coupled in parallel may be directly electrically coupled to more than one electrical device. Additionally, the term "connector" refers to an electrically insulating device that may be connected to a second connector. A connector may transfer electrical signals and/or power via one or more pins. The term "pin" herein refers to an electric conductor that may be mated to another pin to transfer electric power from a first conductor to a second conductor. A pin may be configured as a prong (e.g., male device) or a socket (e.g., female device).

Connector 212 includes pin 212a and pin 212b configured to carry power. Connector 212 includes pins 212d and pin 212e for carrying communications signals. Pin 212c is a signal ground pin. Connector 212 is configured to be mechanically coupled to connector 214 in external accessory device 165 so that pins in connector 212 are in electrical communication with pins in connector 214.

Electric power take-off system 161 includes a low voltage battery 206 that does not provide power to propel the vehicle. In one example, low voltage battery 206 may output 12 volts DC. The low voltage battery 206 may initially provide electric power to the accessory controller 216 so that the accessory does not include a battery. Further, low voltage battery 206 supplies electric power to electric power take-off controller 204, though electric power from low voltage battery 206 may be controlled to a lower voltage level before it is used to operate controller 204. Positive voltage is output from low voltage battery 206 and directly to input 208a of second group relay 208. Chassis ground is coupled to input 208b of second group relay 208 and to low voltage battery 206. Second group relay 208 may selectively electrically couple low voltage battery 206 to connector 212 and first relay group 210. In particular, positive voltage output from battery 206 may be selectively output to output terminal 208c of the second group of relays 208. Negative voltage or chassis ground may be selectively output to output terminal 208d of the second group of relays 208. In this example, second group relay 208 includes double pole single throw contacts (alternatively two single pole single throw) 209 that may be selectively simultaneously opened or closed via controller 204. Output terminal 208c is directly electrically coupled to pin 212a of connector 212 via conductor 285. Output terminal 208d is directly electrically coupled to pin 212b of connector 212 via conductor 286.

Controller 204 may control an operating state of second group relay 208 and first relay group 210. Additionally, controller 204 may communicate with accessory controller 216 by way of pins 212d and 212e of connector 212. Controller 204 includes read-only memory 204a, random access memory 204b, input/output ports 204c, and processor 204d.

External accessory 165 includes a connector 214 that is configured to interface with connector 212. A voltage may be transferred from pins of connector 212 to pins of connector 214. In particular, pin 212a may be electrically coupled to pin 214a and pin 212b may be electrically coupled to pin 214b. Pins 212d and 212e may transfer communication signals to pins 214d and 214e, and vice-versa. A first voltage may be applied to pins 214a and 214b at a first time and a second voltage may be applied to pins 214a and 214b at a second time, the first voltage lower than the second voltage. Relay contacts of relay group 3 may be open when the first voltage is applied to pins 214a and 214b. Relay contacts of relay group 3 may be closed when the second voltage is applied to pins 214a and 214b. Main accessory load 222 may be powered when contacts 224 (e.g., single pole single throw) of relay group 3 (226) are closed. Main accessory load may be a portable trailer, electric motor, lighting, tool, oven, or other electrical load. Accessory controller 216 may selectively open and close contacts 224 of relay group 3 (226).

Voltage regulator 220 may provide a third voltage (e.g., 3.2 volts) when the first or second voltage is applied to pins 214a and 214b. The third voltage may be output of voltage regulator 220 via outputs 220a and 220b. The third voltage may charge capacitor 218 and power accessory controller 216. Capacitor 218 may also power accessory controller 216 during short periods (e.g., less than 15 seconds) of time when voltage regulator 220 is not outputting a voltage. In particular, during a period when voltage applied to pins 214a and 214b is changing from the first voltage to the second voltage, capacitor 218 may provide power to accessory controller 216. Accessory controller 216 includes read-only memory 216a, random access memory 216b, input/output ports 216c, and processor 216d. Accessory controller 216 may sense a voltage between pin 214a and pin 214b via conductors 230.

Thus, the system of FIGS. 1 and 2 provides for an electric power take-off system for a vehicle, comprising: a connector including at least one pin configured to transfer communication data and a first pin and a second pin configured to transfer electric power; a DC/DC converter electrically coupled to a traction battery and a first relay group, the first relay group electrically coupled to the first pin and the second pin; and a power source electrically coupled to a second relay group, the second relay group electrically coupled to the first pin and the second pin. In a first example, the electric power take-off system includes where the first relay group includes double pole single through contacts. In a second example that may include the first example, the electric power take-off system includes where the second relay group includes double pole single through contacts. In a third example that may include one or both of the first and second examples, the electric power take system includes where the power source is a low voltage battery, and where a low voltage battery output voltage is less than a traction battery output voltage. In a fourth example that may include one or more of the first through third examples, the electric power take-off system includes where the first relay group is electrically coupled to the second relay group. In a fifth example that may include one or more of the first through fourth examples, the electric power take-off system further comprises a controller including executable instructions to open and close relays in the first relay group and relays in the second relay group in response to input provided via a controller of an accessory. In a sixth example that may include one or more of the first through fifth examples, the electric power take-off system includes where the controller of the accessory is external to the vehicle. In a seventh example that may include one or more of the first through sixth examples, the electric power take-off system includes where the controller includes additional executable instructions to prevent relays in the first relay group from being closed while relays in the second relay group are closed. In a eighth example that may include one or more of the first through seventh examples, the electric power take-off system includes where the controller is electrically coupled to the at least one pin configured to transfer communication data.

The system of FIGS. 1 and 2 also provides for a system for receiving electric power from an electric power take-off system of a vehicle, comprising: a connector including at least one pin configured to transfer communication data and a first pin and a second pin configured to transfer electric power; a DC/DC converter electrically coupled to a capacitor and a controller, the DC/DC converter electrically coupled to the first pin and the second pin; and an accessory load coupled to a relay group, the relay group electrically coupled to the first pin and the second pin. In a first example, the system further comprises executable instructions to exchange data with a vehicle controller. In a second example that may include the first example, the system further comprises executable instructions to close a relay of the relay group in response to a voltage applied to pins. In a third example that may include one or both of the first the first and second examples, the system includes where the at least one pin configured to transfer communication data transfers communication data between the controller and the vehicle controller. In a fourth example that may include one or more of the first through third examples, the system includes where the capacitor is configured to supply power to the controller when power is not applied to the first pin and the second pin.

Turning now to FIG. 3, an example prophetic sequence to transfer electric power from a vehicle to an accessory device is shown. The operating sequence of FIG. 3 may be produced via the system of FIGS. 1 and 2 performing the method of FIG. 4. The plots of FIG. 3 are aligned in time and occur at the same time. Vertical markers at t0-t4 indicate times of particular interest during the sequence.

The first plot from the top of FIG. 3 represents an operational state of an electric power take-off (ePTO) connector (e.g., 212 of FIG. 2) versus time. The vertical axis represents the operational state of the ePTO connector and the ePTO connector is connected to an external accessory when trace 302 is at a higher level that is near the vertical axis arrow. The ePTO is not connected (e.g., disconnected) to the external accessory when trace 302 is at a lower level that is near the horizontal axis. The horizontal axis represents time and time increases from the left side to right side of the figure. Trace 302 represents the operating state of the ePTO connector.

The second plot from the top of FIG. 3 represents an operational state of contacts of relays in relay group one versus time. The vertical axis represents the operational state of the contacts of relays in relay group one and the relays of relay group one are closed (e.g., permitting transfer of electrical power) when trace 304 is at a higher level that is near the vertical axis arrow. The operation state of the relays of relay group one are open (e.g., not permitting transfer of electrical power) when trace 304 is at a lower level that is near the horizontal axis. The horizontal axis represents time and time increases from the left side to right side of the figure. Trace 304 represents the operating state of contacts of relays in the first relay group.

The third plot from the top of FIG. 3 represents an operational state of contacts of relays in relay group two versus time. The vertical axis represents the operational state of the contacts of relays in relay group two and the relays of relay group two are closed (e.g., permitting transfer of electrical power) when trace 306 is at a higher level that is near the vertical axis arrow. The operation state of the relays of relay group two are open (e.g., not permitting transfer of electrical power) when trace 306 is at a lower level that is near the horizontal axis. The horizontal axis represents time and time increases from the left side to right side of the figure. Trace 306 represents the operating state of contacts of relays in the second relay group.

The fourth plot from the top of FIG. 3 represents an operational state of contacts of relays in relay group three versus time. The vertical axis represents the operational state of the contacts of relays in relay group three and the relays of relay group three are closed (e.g., permitting transfer of electrical power) when trace 306 is at a higher level that is near the vertical axis arrow. The operation state of the relays of relay group three are open (e.g., not permitting transfer of electrical power) when trace 306 is at a lower level that is near the horizontal axis. The horizontal axis represents time and time increases from the left side to right side of the figure. Trace 306 represents the operating state of contacts of relays in the third relay group.

The fifth plot from the top of FIG. 3 represents a voltage that is input to the external accessory versus time. The vertical axis represents the voltage that is input to the external accessory and the voltage increases in the direction of the vertical axis arrow. The horizontal axis represents time and time increases from the left side to right side of the figure. Trace 310 represents the voltage that is input to the external accessory.

The sixth plot from the top of FIG. 3 represents a voltage that is applied to the accessory controller (e.g., 216 of FIG. 2) versus time. The vertical axis represents the voltage that is applied to the accessory controller and the voltage increases in the direction of the vertical axis arrow. The horizontal axis represents time and time increases from the left side to right side of the figure. Trace 312 represents the voltage that is applied to the accessory controller.

The seventh plot from the top of FIG. 3 represents a voltage that is applied to the main load of the external accessory (e.g., 222 of FIG. 2) versus time. The vertical axis represents the voltage that is applied to the accessory and the voltage increases in the direction of the vertical axis arrow. The horizontal axis represents time and time increases from the left side to right side of the figure. Trace 314 represents the voltage that is applied to the accessory.

At time t0, the ePTO connector is disconnected from the external accessory. The contacts of group 1, group 2, and group 3 relays are open. The voltage input to the external accessory is zero and the voltage that is applied to the external accessory controller is zero. The voltage that is applied to the main load of the external accessory is zero.

At time t1, the ePTO connector is connected to the external accessory. This causes the contacts of group 2 relay to close, thereby allowing a lower voltage to be input to the external accessory. The voltage that is applied to the external accessory controller increases allowing the external accessory controller to operate. The external controller initiates communication with the ePTO controller (not shown). The external controller and the ePTO controller may exchange status data including but not limited to external accessory type, external accessory power requirements, operational status of the external accessory, status of the ePTO, electrical power limits for the ePTO, etc.

At time t2, the operational status of the external accessory is verified and so the ePTO controller commands the contacts of the group 2 relay open. The ePTO remains connected to the external accessory and the voltage input to the external accessory is reduced to zero. However, since the external accessory includes a capacitor, the voltage applied to the external accessory controller remains at a higher level allowing the external accessory controller to continue operating. The voltage applied to the main load of the external accessory remains zero.

At time t3, the ePTO controller closes the contacts of the group 1 relay allowing a second higher voltage to be input to the external accessory. The voltage that is applied to the external accessory controller begins to increase as a voltage regulator in the external accessory begins to supply electric power to the external accessory controller. The voltage that is applied to the main external accessory load remains zero so that time is provided for the voltage to increase. The ePTO DC/DC converter may be activated at this time or at time t1.

At time t4, the external controller commands the contacts of the group 3 relay to close and voltage is applied to the main load of the external accessory load. The ePTO connector remains connected and the contacts of the group 1 relays remain closed. The contacts of the group 2 relays remain open so that the low voltage source may not be electrically coupled to the DC/DC converter output.

In this way, a lower voltage may be transferred from a vehicle so that system checks may be performed in the external accessory before the higher voltage is delivered to the external accessory. The lower voltage and the higher voltage are transferred between the vehicle and the external accessory via a same set of connector pins so that an existing connector with fewer pins may be utilized in the system.

Moving on to FIG. 4, an example method for transferring electrical power from a vehicle to an accessory that is external to the vehicle is shown. The method of FIG. 4 may be incorporated into and may cooperate with the systems of FIGS. 1 and 2. Further, at least portions of the method of FIG. 4 may be incorporated as executable instructions stored in non-transitory memory of one or more controllers of the system. The method may be performed via one or more controllers transforming operating states of devices and actuators in the physical world.

At 402, method 400 judges whether or not an electric power take-off is electrically coupled to an external accessory. In one example, a user may provide an indication of said coupling or a sensor may provide an indication of said coupling. If method 400 judges that the electric power take-off is electrically coupled to an external accessory, the answer is yes and method 400 proceeds to 404. Otherwise, the answer is no and method 400 proceeds to 440.

At 440, method 400 deactivates the electric power take-off DC/DC converter and opens electrical contacts of relay groups 1-3. For example, an electric power-take off controller may open electrical contacts of relay groups 1 and 2 while an external accessory controller may open electrical contacts of relay group 3. The electric power-take off controller may deactivate the DC/DC converter by opening all power transistors of the DC/DC converter. By opening the contacts of the relay groups, power may be prevented from being delivered to the external accessory. Method 400 proceeds to exit.

At 404, method 400 closes electrical contacts of the group 2 relays while the electrical contacts of the group 1 relays are held open. The electrical contacts of the group 3 relays are also held open so that electric power is not delivered to the main load of the external accessory. Method 400 proceeds to 406.

At 406, method 400 provides a low voltage (e.g., a first voltage) electrical power to the external accessory controller via a voltage regulator in the external accessory and a low voltage battery of the electric power take-off. Method 400 proceeds to 408.

At 408, method 400 establishes communication between the controller of the external accessory device and the controller of the electric power take-off device. The communication may include exchange of data over a network and the data may include but is not limited to external accessory type, external accessory power requirements, operational status of the external accessory, status of the ePTO, electrical power limits for the ePTO, etc. Method 400 proceeds to 410.

At 410, method 400 opens electrical contacts of relay group 2 after the external accessory is verified to have an acceptable status. The group 2 relay contacts are open to remove the low voltage from the external accessory. Method 400 provides to 412.

At 412, method 400 closes the electrical contacts of group 1 relays and power delivery to the external accessory controller is maintained via a capacitor supplying power to the external accessory controller. The capacitor supplies power that was originally supplied by the low voltage power supply to the voltage regulator of the external accessory. Method 400 proceeds to 414.

At 414, method 400 activates the DC/DC converter of the electric power take-off. The DC/DC converter may be activated by turning on and off transistors of the DC/DC converter. Method 400 proceeds to 416.

At 416, method 400 senses the voltage that is delivered to the external accessory. The controller of the external accessory may monitor the voltage that is applied to the external accessory. Method 400 proceeds to 418.

At 418, method 400 judges whether or not a voltage that is delivered by the electric power take-off to the external accessory is within a prescribed range. If so, the answer is yes and method 400 proceeds to 420. Otherwise, the answer is no and method 400 proceeds to 430.

At 430, method 400 judges whether or not a threshold amount of time has passed since the most recent time the contacts of the group 2 relays have opened. If so, the answer is yes and method 400 proceeds to 432. Otherwise, the answer is no and method 400 returns to 418.

At 432, method 400 provides an indication of a system error via a human/machine interface. Method 400 proceeds to exit.

At 420, method 400 closes electric contacts of relay group 3 and powers the main load of the external accessory via a second higher voltage that is provided via the DC/DC converter of the electric power take-off. Method 400 proceeds to exit.

In this way, method 400 may power an external accessory with a low voltage to establish that the external accessory passes a system check. Once the external accessory passes the system check, a higher voltage may be applied to operate the external accessory.

Thus, method 400 provides for an electric power take-off method for a vehicle, comprising: supplying power from a first power source to a first pin and a second pin of a connector while a second power source is not electrically coupled to the first pin and the second pin, where the first power source is a DC/DC converter, and where the second power source is an electric energy storage device; and supplying power from the second power source to the first pin and the second pin of the connector while the first power source is not electrically coupled to the first pin and the second pin, where a first power supply outputs a first voltage and the second power supply outputs a second voltage, the first voltage greater than the second voltage. In a first example, the electric power take-off method includes where the first power source supplies power to the first pin and the second pin via closing relays of a first relay group via a controller. In a second example that may include the first example, the electric power take-off method includes where the second power source supplies power to the first pin and the second pin via closing relays of a second relay group via a controller. In a third example that may include one or both of the first and second examples, the electric power take-off method includes where the first power source supplies power to the first pin and the second pin based on output of a controller of an accessory, the accessory external to the vehicle. In a fourth example that may include one or more of the first through third examples, the electric power take-off method includes where the second power source supplies power to the first pin and the second pin based on activation of an electric power take-off system. In a fifth example that may include one or more of the first through fourth examples, the electric power take-off method further comprises exchanging data between a controller of the vehicle and a controller of an accessory device that is external to the vehicle.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric power take-off system of a vehicle, comprising:
   a connector including at least one pin configured to transfer communication data and a first pin and a second pin configured to transfer electric power;
   a DC/DC converter electrically coupled to a traction battery and a first relay group, the first relay group electrically coupled to the first pin and the second pin;
   a power source electrically coupled to a second relay group, the second relay group electrically coupled to the first pin and the second pin; and
   a controller including executable instructions to open and close relays in the first relay group and relays in the second relay group in response to input provided via an external accessory controller, and where the controller includes additional executable instructions to prevent relays in the first relay group from being closed while relays in the second relay group are closed.

2. The electric power take-off system of claim 1, where the first relay group includes double pole single throw contacts.

3. The electric power take-off system of claim 1, where the second relay group includes double pole single throw contacts.

4. The electric power take system of claim 1, where the power source is a low voltage battery, and where a low voltage battery output voltage is less than a traction battery output voltage.

5. The electric power take-off system of claim 1, where the first relay group is electrically coupled to the second relay group.

6. The electric power take-off system of claim 1, where the DC/DC converter includes a positive output and a negative output, and where the positive output is coupled to a first input terminal of the first relay group, the negative output is coupled to a second input terminal of the first relay group, and the first relay group is electrically coupled to the first pin via a first output of the first relay group and to the second pin via a second output of the first relay group.

7. The electric power take-off system of claim 1, where the external accessory controller is external to the vehicle.

8. The electric power take-off system of claim 6, where the power source is electrically coupled to the second relay group via a first input of the second relay group and to a second input of the second relay group, and the second relay group is electrically coupled to the first pin via a first output of the second relay group and to the second pin via a second output of the second relay group.

9. The electric power take-off system of claim 6, where the controller is electrically coupled to the at least one pin configured to transfer communication data.

10. An electric power take-off method for a vehicle, comprising:
    supplying power from a first power source to a first pin and a second pin of a connector while a second power source is not electrically coupled to the first pin and the second pin, where the first power source is a DC/DC converter, and where the second power source is an electric energy storage device; and
    supplying power from the second power source to the first pin and the second pin of the connector while the first power source is not electrically coupled to the first pin and the second pin, where the first power source outputs a first voltage and the second power source outputs a second voltage, the first voltage greater than the second voltage.

11. The electric power take-off method of claim 10, where the first power source supplies power to the first pin and the second pin via closing relays of a first relay group via a controller.

12. The electric power take-off method of claim 10, where the second power source supplies power to the first pin and the second pin via closing relays of a second relay group via a controller.

13. The electric power take-off method of claim 10, where the first power source supplies power to the first pin and the second pin based on output of a controller of an accessory, the accessory external to the vehicle.

14. The electric power take-off method of claim 13, where the second power source supplies power to the first pin and the second pin based on activation of an electric power take-off system.

15. The electric power take-off method of claim 10, further comprising exchanging data between a controller of the vehicle and an external accessory controller that is external to the vehicle.

16. A system for receiving electric power from an electric power take-off system of a vehicle, comprising:
- a connector including at least one pin configured to transfer communication data and a first pin and a second pin configured to transfer electric power;
- a DC/DC converter electrically coupled to a capacitor and a controller, the DC/DC converter electrically coupled to the first pin and the second pin; and
- an accessory load coupled to a relay group, the relay group electrically coupled to the first pin and the second pin.

17. The system of claim 16, further comprising executable instructions to exchange data with a vehicle controller.

18. The system of claim 17, further comprising executable instructions to close a relay of the relay group in response to a voltage applied to the first pin and the second pin.

19. The system of claim 17, where the at least one pin configured to transfer communication data transfers communication data between the controller and the vehicle controller.

20. The system of claim 19, where the capacitor is configured to supply power to the controller when power is not applied to the first pin and the second pin.

* * * * *